United States Patent

[11] 3,619,244

| [72] | Inventors | Robert Holroyd Stanley<br>Shincliffe Village;<br>George Harry James Neville, Darlington;<br>Frank Pickering, Billingham, all of England |
|---|---|---|
| [21] | Appl. No. | 714,620 |
| [22] | Filed | Mar. 20, 1968 |
| [45] | Patented | Nov. 9, 1971 |
| [73] | Assignee | British Titan Products Company Limited<br>Durham, England |
| [32] | Priority | Apr. 18, 1967 |
| [33] | | Great Britain |
| [31] | | 17709/67 |

[54] PRODUCTION OF TREATED MATERIALS
30 Claims, 1 Drawing Fig.

[52] U.S. Cl. .................................................. 117/47 A,
117/76 F, 117/106, 117/138.8 E, 117/138.8 F,
117/138.8 U, 117/144.5, 117/159

[51] Int. Cl. ............................................ B44d 1/092,
B44d 5/06

[50] Field of Search ................................ 117/47 A,
105.3, 106, 107.1, 138.8 E, 138.8 F, 138.8 U, 144,
144.5, 159, 71 R, 76 F, 60

[56] References Cited
UNITED STATES PATENTS

| 2,118,795 | 5/1938 | Littleton | 117/159 X |
| 2,768,909 | 10/1956 | Haslam | 117/127 X |
| 2,908,593 | 10/1959 | Naidus | 117/127 X |
| 2,941,895 | 6/1960 | Haslam | 106/193 |
| 3,071,482 | 1/1963 | Miller | 117/159 X |
| 3,082,117 | 3/1963 | Schilly | 117/138.8 X |
| 3,087,828 | 4/1963 | Linton | 117/159 X |
| 3,087,829 | 4/1963 | Linton | 117/100 X |
| 3,409,429 | 11/1968 | Ekman et al. | 117/221 X |
| 3,437,515 | 4/1969 | Quinn et al. | 117/159 X |
| 3,460,956 | 8/1969 | Dahle | 117/127 X |

FOREIGN PATENTS

| 932,652 | 7/1963 | Great Britain | 117/76 |
| 935,730 | 9/1963 | Great Britain | 117/76 |

*Primary Examiner*—William D. Martin
*Assistant Examiner*—M. R. Lusignan
*Attorney*—Irons, Birch, Swindler & McKie ABSTRACT: A process for the production of iridescence on synthetic polymeric surfaces by applying to the surface as a film of variable thickness adequate to produce iridescence within the visible spectrum a titanium compound having the general formula Ti(X)$_4$ in which X represents a halogen atom or a (–OR) group and subsequent to application of the film ageing the treated surface at a temperature above 85° C. The titanium compound is preferably titanium tetrachloride although organic titanates are also useful and the synthetic polymeric surface is preferably a surface formed of polyethylene terephthalate.

PATENTED NOV 9 1971 3,619,244
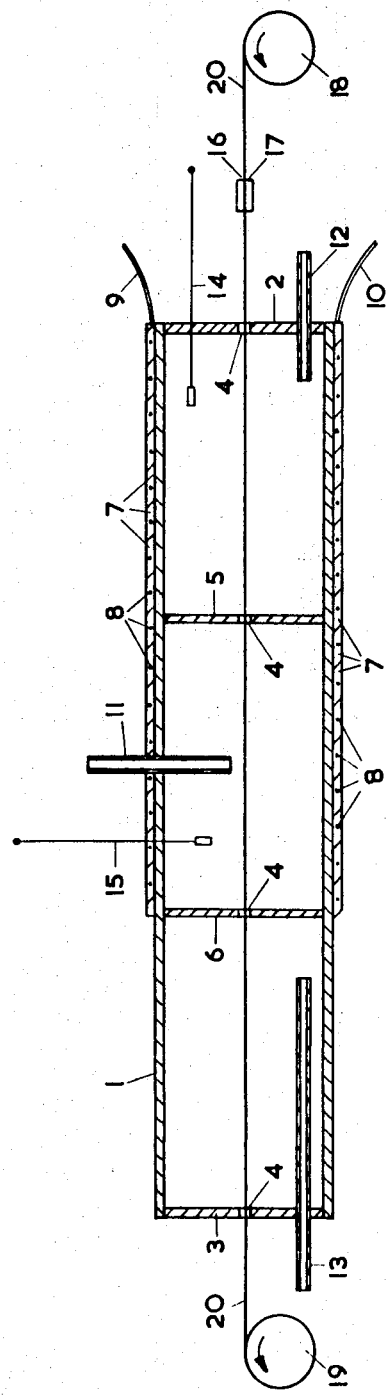

PRODUCTION OF TREATED MATERIALS

The present invention relates to a method for the production of iridescence on surface.

The production of iridescence on surfaces is of considerable commercial value since it greatly enhances the aesthetic appeal of such surfaces. Iridescence may, for example, be produced upon the surface of a sheet of polymer film, such as a clear polyester film, and the appearance of the film is thus greatly enchanced and is particularly suitable for use in the manufacture of various articles. One particularly suitable use for such iridescent film is to cut the sheet to form filaments and thereafter to weave the filaments into a fabric which may, for example, be used for making clothes, etc. In such cases, of course, the fabric exhibits the iridescence initially produced on the surface of the sheet of polymer and also the variegation produced due to the weave.

According to the present invention a process for the production of iridescence on synthetic polymeric surfaces comprises applying to the surface, as a film of variable thickness, a titanium compound having the general formula $Ti(X)_4$ in which X represents a halogen atom or a (–OR) group wherein R represents an organic radical and wherein two or more X groups can be the same or different, the thickness of the film deposited being adequate to produce iridescence within the visible spectrum, and subsequent to application of the film, ageing the so-treated surface at a temperature above 85° C. and below the melting point or decomposition point of the surface.

The present invention is useful for the production of iridescence on synthetic polymeric surfaces generally and the synthetic polymeric surface can be the surface of a sheet or a film of a synthetic polymeric material Synthetic polymeric materials which can be treated according to the method of the present invention are, for example, polyolefins or copolymers of two or more olefins, polyvinyl compounds or polyvinylidene compound, polyacrylates and polyalkyl acrylates and copolymers of acrylates or alkyl acrylates, polyesters such as cellulosic esters, polycarbonates, polyvinyl alcohol esters and polyethylene condensation esters. Typical polymers are polyethylene, copolymers of ethylene and propylene, polyvinyl chloride, polyvinylidene chloride, polymethyl methacrylate, polyethyl acrylate and cellulosic esters. The invention is of particular use when applied to a synthetic textile-forming polyester such as polyethylene terephthalate.

The titanium compounds used for the purpose of this invention are titanium tetrahalides, such as the bromide or iodide but particularly titanium tetrachloride, or alkyl titanates in which at least one of the valences of the titanium is satisfied by an aloxy group, preferably those containing from one to four carbon atoms, e.g. tetra-alkyl titanates and alkoxy titanium halides particularly dialkoxy titanium dichlorides and alkanolamino titanates such as triethanolamine titanate. The same or different halogen atoms and/or alkoxy groups can be present in the titanium compound. Typical alkyl titanates which can be employed are tetraisopropyl titanate or tetranormalbutyl titanate.

The titanium compound may be applied to the surface as a film of variable thickness by any suitable method, for example the surface may be moved longitudinally under one or more orifices above the surface through which the titanium compound is introduced at a suitable rate. The compound may be applied through a jet or by means of a suitable printing technique either as a neat liquid or in solution. Alternatively, as desired, the compound can be used in the form of a solution in which the synthetic polymeric material can be dipped.

Normally, in view of the small amount of titanium compound to be applied to the surface to form a coating of the appropriate thickness, the compound may be introduced through a jet by means of a carrier gas in which is dispersed a suitable concentration of the titanium compound. It is preferred to apply the titanium compound in the presence of a small amount of moisture. The small amount of moisture may be that which is normally present under the conditions of application.

It is believed that such a jet of carrier gas strikes the surface and then spreads out over the surface depositing decreasing amounts of the titanium compound as the area covered increases, thus forming a film of titanium compound of variable thickness. The carrier gas can conveniently be nitrogen or dry air.

If longitudinal bands of iridescence are required, i.e. bands along the direction of movement of the surface under the orifice(s) then the orifice(s) may be stationary. If, however, transverse bands of iridescence are desired, i.e. at an angle to the direction of movement of the surface, then the orifice(s) may be moved across the surface as it moves beneath them. The flow of titanium compound to the surface may be continuous of intermittent.

Alternatively, of course, the surface may be stationary and the orifice(s) moved in the appropriate manner but this is not preferred, particularly when very long sheets of material are to be treated by the process of the present invention.

It is believed that the iridescence is produced by interference of light reflected at the interfaces bounding the thin film containing titanium and the color is determined by the thickness of the film. Variation of the color may be obtained by varying the thickness of the film by any appropriate means. Usually the film will have a thickness of from 2,000 Angstroms to 70,000 Angstroms, particularly from 2,000 Angstroms to 20,000 Angstroms.

The application of the titanium compound to the surface usually is effected at an elevated temperature and preferably the treated surface is allowed to cool after deposition of the film in the presence of an inert atmosphere such as provided by a carrier gas.

In order to develop and/or stabilize the iridescence on the surface to the attack of hot water, it has been found necessary to age the treated film, at a temperature of at least 85° C. The temperature should not, of course, be in excess of the melting point or the decomposition point of the surface. Preferably the iridescent film is heated at a temperature in excess of 100° C. The ageing of the treated surface should be continued for the minimum time necessary for the development and/or stabilization of the iridescence.

To produce a surface having iridescence resistant to attack by cleansing agents, e.g. soap solution, it has been found preferable to treat the surface, or otherwise to prime it prior to treatment with the titanium compound. Typical methods of treatment are to subject the surface to an electric corona discharge or to the action of a priming agent which can be, for example, a synthetic resin composition, generally a thermosettable resin composition, which forms a layer on the surface to be treated subsequently with the titanium compound. One suitable resin composition is based on an acrylic resin, e.g. a hydroxy acrylic resin which can be cured with, for example, an amine or with a melamine/formaldehyde resin. Other resin compositions which can be employed are phenol/formaldehyde resins, resorcinol/formaldehyde resins, urea/aldehyde resins and epoxy resins.

Other suitable resin compositions which can be used to prime the surface of the synthetic polymeric material are those based on polyurethane compositions, for instance, the reaction product of a polyol or polyester amide and a polyisocyanate wherein the polyol can be a polyester or polyether containing two or more groups having active hydrogen atoms capable of reacting with isocyanate groups. The isocyanate used to prepare the polyurethane treating composition will be an aliphatic or aromatic polyisocyanate containing two or more free isocyanate groups. The isocyanate treated composition can be prepared immediately prior to use by mixing the respective polyol or polyester amide and isocyanate compounds with suitable catalysts and cross-linking agents or chain extension agents, if desired, or alternatively, a polyol and an isocyanate can be reacted together prior to application to the surface to reacted a prepolymer usually having free isocyanate groups which can react wit a cross-linking agent or a chain extension agent in the presence of a catalyst, if desired, subsequent to application to the surface of the synthetic polymeric material.

It has been found desirable to heat treat such a resin composition primed surface prior to treatment with the titanium compound, for example at a temperature in the range 120° C. to 180° C., when possible to cure or partially cure said resin composition.

One convenient method of applying the titanium compound and heat to the surface is by passing the material to be treated at a suitable rate through an elongated zone which is heated to the desired temperature and to apply the titanium compound to the surface through an appropriately placed orifice(s) which may be moveable as previously indicated, if desired within this zone.

After treatment it may be advantageous to buff the surface.

The process of the present invention is particularly suitable for the production of iridescent polymer films which can be used for the production of woven fabrics or other articles required to have a decorative appeal. The iridescent films or sheet can also be used to manufacture articles such as eyeglass or spectacle frames, for instance where an iridescent film or sheet can be laminated with one or more support sheets of a plastic material to produce a laminate from which the frame can be cut.

The invention is illustrated in the following examples.

EXAMPLE 1

The apparatus for effecting the treatment is as shown in the accompanying diagrammatic drawing.

The apparatus consists of a horizontal glass tube 1 of 6 inches internal diameter and 72 inches in length, provided with a metal end plate 2, 3 at each end, each plate having a horizontal slit 4 of size 5 inches wide and 0.01 inch in depth. Two similarly slotted divider plates 5, 6 are positioned along the tube 1.

Asbestos tape 7 carrying an electrical heating element 8 is wound about the outside of the first 48 inches of the tube. The ends 9, 10 of the element 8 are connected to a power supply (not shown).

A glass conduit 11 having an outlet orifice 0.2 inches diameter passes through a hole in the top of the tube at a point 36 inches from the end plate 2 and provision is made to connect this to a supply of dry nitrogen containing titanium tetrachloride vapor. The end plate 2 is also provided with an inlet port 12 for the supply to the tube of dry nitrogen only (for purging air form the apparatus) and the other end plate 2 carries an outlet tube 13 to exhaust excess vapor from the tube 1. Two thermometers 14 and 15 are also fitted.

The apparatus also includes a pair of baize- or felt-covered pressure plates 16, 17 which can be used to clean film or to apply tension to the film supplied from a reel 18. A takeoff reel 19 is also included.

A solution was prepared from the following ingredients:

| | parts by weight |
|---|---|
| Hydroxy-acrylic resin | 7 |
| Butylated melamine/formaldehyde resin | 3 |
| Xylene | 4 |
| Butanol | 1 |

The hydroxy-acrylic was obtainable commercially under the name EPOK D2101 and the resin under the name EPOK U9192. The copolymer and the resin were dissolved in the mixed solvents to give a 0.25 percent solution.

A strip of Melinex (Registered Trademark) clear polyethylene terephthalate film 4 inches wide was dipped into the solution and surface solution allowed to drain from the strip. The strip was passed through the apparatus described to dry the strip. and to effect this, the apparatus was maintained at a temperature of 180° C.

The strip indicated at 20 was then fed from a reel 18 between two plates 16, 17 faced with baize; into the tube 1 through the slit 4 in one end plate 2; through the tube 1; out of the slit 4 in the other end plate 3 and to a second reel from which it was recovered.

The tube 1 adjacent the heating element was maintained at a steady temperature of 180° C., and dry nitrogen fed into the tube via inlet 12. Nitrogen which had been saturated by bubbling through liquid TiClhd 4 at room temperature was continuously supplied to the glass conduit 11, the outlet orifice of which was as close as possible to the strip 20 without actually touching it and the strip was then passed through the tube and under the orifice at a rate of 2 ft./minute. When the strip 20 had been treated excess $TiCl_4$ was removed from the tube through outlet 13 and the strip was allowed to cool whilst moving through the last 2 feet of the apparatus prior to being wound in reel 19. The cool strip was then heated for 70 minutes at 180° C.

Upon examination after recovery it was found that two stable parallel bands of iridescence had been formed about 1 inch wide on each side of the longitudinal axis of the strip. This iridescence was bright and showed no sign of fading.

The colored strip was found to be able to withstand boiling in 0.5 percent soap solution for up to 1 hour without losing its color.

The experiment was repeated but omitting the treatment of the film with the acrylic copolymer solution. After treatment with titanium tetrachloride vapor the iridescent film was not heated. The iridescent film was not resistant to boiling water or to boiling soap solution.

A further iridescent film but obtained without the use of the acrylic copolymer solution but this film was aged at 180° C. for 1 hour. The film was able to withstand boiling in water for at least 1 hour and able to withstand boiling in 0.5 percent soap solution for 10 minutes without losing its color.

EXAMPLE 2

The apparatus described in example 1 was used to threat the surfaces of polyethylene and cellophane sheet material with titanium tetrachloride vapor.

Polyethylene film which had not been previously treated with the acrylic copolymer solution was subjected to the action titanium tetrachloride in the apparatus at 100° C. After treatment the film was heated for 1 hour at 90° C. The iridescent film so obtained was resistant for at least 60 minutes to the action of boiling water and was resistant to the action of boiling 0.5 percent soap solution for approximately 15 minutes without losing its color.

Polyethylene film material was treated in the apparatus at 100° C. after being treated with the acrylic copolymer solution and heated as described in example 1. During the heating stage prior to treatment with titanium tetrachloride the apparatus was maintained at 90° C. The iridescent film was heated at 90° C. for 30 minutes to age the iridescence. The iridescent film was resistant for at least 1 hour to the action of boiling water and also was resistant to the action of boiling 0.5 percent soap solution for at least 1 hours without losing its color. Cellophane film was treated in the apparatus described in example 1 at a temperature of 130° C. without being previously treated with the acrylic copolymer solution. After treatment the iridescent film so obtained was heated at 125° C. for 1 hour and then was resistant to the action of boiling water for at least 1 hours and resistant to the action of boiling 0.5 percent soap solution for at least 1 hour without losing its color.

Cellophane film was treated with the acrylic copolymer solution as described in example 1 and heated in the apparatus maintained at a temperature of 130° C. to dry the treated surface. The film was then subjected to titanium tetrachloride vapor on the apparatus at a temperature of 124° C. The iridescent film obtained was resistant to the action of boiling water or to boiling 0.5 percent soap solution for periods of at least 1 hour without losing its color.

EXAMPLE 3

A number of samples of polyethylene terephthalate film (Melinex) having been treated with the acrylic copolymer solution as described in example 1 and maintained at a temperature of between 120° C. and 160° C. were dipped into various solutions of titanium tetrachloride in toluene at concentrations between 10 and 50 percent and allowed to drain. The toluene was removed after the treatment by stripping off in an inert atmosphere. A number of coats were applied to each sample of film so treated. The resultant film after heat ageing at 180° C. for 70 minutes exhibited iridescence but the resulting color was not as strong as that obtained when using titanium tetrachloride in the vapor state according to the process of example 1 and the films were able to withstand the action of boiling 0.5 percent soap solution without losing their color.

The experiment described previously in this example was repeated but by dipping acrylic copolymer treated films of polyethylene terephthalate at temperatures of between 80° C. and 140°C. into a 20 percent solution of diisopropoxy titanium dichloride in isopropanol containing from 1-5 percent of acetyl acetone to prevent premature hydrolysis. The treated films after removing the solvent and ageing exhibited iridescence which was resistant to the action of boiling 0.5 percent soap solution.

The experiment described above in this example was repeated four times using acrylic copolymer treated polyethylene terephthalate film at a temperature of between 100° C. and 180° C. and the following treatment solutions:

Solutions Used To Treat Film 1 percent triethanolamine titanate in isopropanol
2 percent polybutyl titanate in heptane
60 percent polypropyl titanate in isopropanol
30 percent butyl titanate in butanol.

After removal of the solvent from the treated films and heat ageing, each film exhibited iridescence which was resistant to the action of boiling 0.5 percent soap solution for up to 1 hour.

EXAMPLE 4

This example illustrates the production of iridescence on a film of polyethylene terephthalate (Melinex) and prior treatment of the film with a priming composition comprising a polyurethane.

The polyurethane priming composition was prepared from part A on an amount of 1 part by weight, part B in an amount of 4 parts by weight and 1 part of an aliphatic isocyanate based on hexamethylene diisocyanate sold under the name of Desmodur N. The various parts of the polyurethane priming composition are as follows:

PART A

|  | parts by weight |
|---|---|
| 60% polyester polyol | 166 |
| 60% polyester | 166 |
| silicone oil (1%) | 12 |
| 8% zinc naphthenate | 5 |
| Mixed solvent | 448 |

PART B—MIXED SOLVENT

|  | parts by weight |
|---|---|
| Methyl ethyl ketone | 436 |
| Butyl acetate | 146 |
| Cellosolve acetate | 436 |
| Toluene | 146 |

The "polyester polyol" was a reaction product of trimethylolpropane and phthalic anhydride sold under the name Desmophen 650 and the "polyester" was obtainable under the name Alkydal RD18.

The film was passed through the priming composition and then dried at a temperature of approximately 180° C.

The treated film was then subjected to the treatment with titanium tetrachloride vapor as described in example 1 and after passing through the apparatus, the film was heated for approximately 0.75 hours at 180° C.

The treated film had an iridescent coating which was resistant to action by boiling in an 0.5 percent soap solution for 1 hour.

EXAMPLE 5

The experiment described in example 1 for the production of an iridescent surface was repeated except that the surface was subjected to an electric corona discharge instead of the treatment with the acrylic copolymer solution and heating of the treated surface prior to contact with titanium tetrachloride was omitted. After treatment with titanium tetrachloride the iridescent surface so obtained was heated for 70 minutes at 180° C. and the film was resistant to action of boiling 0.5 percent soap solution without losing its color.

What is claimed is:

1. A process for the production of iridescence on synthetic polymeric surfaces which comprises subjecting the surface to corona discharge treatment applying to the treated surface as a film of variable thickness, a titanium compound having the general formula $Ti(X)_4$ in which X represents a halogen atom or an (-OR) group wherein R represents an organic radical and wherein two or more X groups can be the same of different, the thickness of the film deposited being adequate to produce iridescence within the visible spectrum and subsequent to application of the film ageing the so-treated surface at a temperature above 85° C. and below the melting point or decomposition point of the surface.

2. A process according to claim 1 in which the titanium compound is titanium tetrachloride.

3. A process according to claim 1 in which the titanium compound is an alkyl titanate in which at least one of the valences of titanium is satisfied by an alkoxy group.

4. A process according to claim 3 in which the alkoxy group contains from one to four carbon atoms.

5. A process according to claim 1 in which the titanium compound is an alkoxy titanium halide.

6. A process according to claim 1 in which the titanium compound is an alkanolamino titanate.

7. A process according to claim 1 in which the treated surface is heated at a temperature of above 100° C. to age said surface 8. A process according to claim 1 in which the titanium compound is deposited on said surface in the presence of a small amount of water.

9. A process according to claim 1 in which the titanium compound is applied to the surface in the form of a solution of the titanium compound in a suitable solvent.

10. A process according to claim 1 in which the deposited film of titanium compound on the surface has a thickness of from 2,000A to 70,000A.

11. A process according to claim 1 in which the surface after treatment with the titanium compound is allowed to cool in the presence of an inert atmosphere prior to ageing.

12. A process according to claim 1 in which the synthetic polymer surface is a polyolefin, a copolymer of two or more olefins, a polyvinyl compound, a polyvinylidene compound, a polyacrylate, a polyalkylacrylate, a copolymer of an acrylate, a copolymer of an alkylacrylate or a polyester.

13. A process according to claim 10 in which the deposited film has a thickness of from 2,000A to 20,000A.

14. A process according to claim 12 in which the synthetic polymeric surface is polyethylene terephthalate.

15. A process for the production of iridescence on synthetic polymeric surfaces which comprises subjecting the surface to a thermosettable resin composition treatment, applying to the treated surface as a film of variable thickness, a titanium compound having the general formula $Ti(X)_4$ in which X represents a halogen atom or an (–OR) group wherein R represents an organic radical and wherein two or more X groups can be the same or different, the thickness of the film deposited being adequate to produce iridescence within the visible spectrum and subsequent to application of the film ageing the so-treated surface at a temperature above 85° C. and below the melting point or decomposition point of the surface.

16. A process according to claim 15 in which the titanium compound is titanium tetrachloride.

17. A process according to claim 15 in which the titanium compound is an alkyl titanate in which at least one of the valences of titanium is satisfied by an alkoxy group.

18. A process according to claim 15 in which the titanium compound is an alkoxy titanium halide.

19. A process according to claim 15 in which the titanium compound is an alkanolamino titanate.

20. A process according to claim 15 in which the treated surface is heated at a temperature of above 100° C. to age said surface.

21. A process according to claim 15 in which the titanium compound is deposited on said surface in the presence of a small amount of water.

22. A process according to claim 15 in which the titanium compound is applied to the surface in the form of a solution of the titanium compound in a suitable solvent.

23. A process according to claim 15 in which the deposited film of titanium compound on the surface has a thickness of from 2,000A to 70,000A.

24. A process according to claim 15 in which the surface after treatment with the titanium compound is allowed to cool in the presence of an inert atmosphere prior to aging.

25. A process according to claim 15 in which the synthetic polymer surface is selected from the class consisting of a polyolefin, a copolymer of two or more olefins, a polyvinyl compound, a polyvinylidene compound, a polyacrylate, a polyalkylacrylate, a copolymer of an acrylate, a copolymer of an alkylacrylate and a polyester.

26. A process according to claim 15 in which the thermosettable resin composition is based on a resin selected from the class consisting of an acrylic resin, a phenol/formaldehyde resin, a resorcinol/formaldehyde resin, a urea/formaldehyde resin, an epoxy resin and a polyurethane forming composition.

27. A process according to claim 17 in which the alkoxy group contains from one to four carbon atoms.

28. A process according to claim 23 in which the deposited film has a thickness of from 2,000A to 20,000A.

29. A process according to claim 25 in which the synthetic polymeric surface is polyethylene terephthalate.

30. A process according to claim 26 in which said resin composition is heated subsequent to application to the surface to cure said composition.

* * * * *